(12) United States Patent
Yang et al.

(10) Patent No.: US 12,533,533 B2
(45) Date of Patent: Jan. 27, 2026

(54) SEALING COMPONENTS, FOCUSED ULTRASOUND TREATMENT SYSTEM AND OPERATION METHOD, SEMI-DRY ACOUSTIC COUPLING APPARATUS

(71) Applicant: HANGZHOU FOSURG TECHNOLOGY CO., LTD., Hangzhou (CN)

(72) Inventors: Tong Yang, Ningbo (CN); Wei Sun, Ningbo (CN)

(73) Assignee: HANGZHOU FOSURG TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/728,464

(22) PCT Filed: Dec. 19, 2022

(86) PCT No.: PCT/CN2022/139850
§ 371 (c)(1),
(2) Date: Aug. 19, 2024

(87) PCT Pub. No.: WO2023/134395
PCT Pub. Date: Jul. 20, 2023

(65) Prior Publication Data
US 2025/0082967 A1 Mar. 13, 2025

(30) Foreign Application Priority Data

Jan. 14, 2022 (CN) .......................... 202210041676.X
Oct. 28, 2022 (CN) .......................... 202211334683.5

(51) Int. Cl.
*A61N 7/00* (2006.01)

(52) U.S. Cl.
CPC ..................................... *A61N 7/00* (2013.01)

(58) Field of Classification Search
CPC .... A61N 7/00; A61N 7/02; A61B 8/42; A61B 8/4272; A61B 8/4281; A61B 8/429;
(Continued)

(56) References Cited

U.S. PATENT DOCUMENTS

| 4,955,365 A | 9/1990 | Fry et al. |
| 6,146,377 A | 11/2000 | Lee et al. |

(Continued)

FOREIGN PATENT DOCUMENTS

| CN | 1215616 A | 5/1999 |
| CN | 1814324 A | 8/2006 |

(Continued)

*Primary Examiner* — Carolyn A Pehlke
(74) *Attorney, Agent, or Firm* — Bayramoglu Law Offices LLC

(57) ABSTRACT

The provided are sealing components, a focused ultrasound treatment system and an operation method thereof, and a semi-dry acoustic coupling apparatus. The focused ultrasound treatment system includes a medium container with two ends opened, a waterproof adhesive ring, an ultrasound emission device, a gas pressure increase/decrease component, a coupling fluid increase/decrease component, and a pressure control module, where a first connecting surface of the waterproof adhesive ring is configured to attach to the skin of a patient; a second connecting surface of the waterproof adhesive ring is bonded with a first end of the medium container, and a second end of the medium container is tightly connected with a shell of the ultrasound emission device. The provided has advantages of simple device, reduced attenuation, thorough coupling, improved efficacy, reduced risk, and no damage to an ultrasonic imaging probe.

11 Claims, 7 Drawing Sheets

(58) Field of Classification Search
CPC ........... A61B 2017/22014; A61B 2017/22015; A61B 17/22004
See application file for complete search history.

(56) References Cited

U.S. PATENT DOCUMENTS

| | | | |
|---|---|---|---|
| 10,814,147 B2* | 10/2020 | Payne | ................. A61B 5/055 |
| 2003/0171675 A1 | 9/2003 | Rosenberg et al. | |
| 2013/0197550 A1 | 8/2013 | Dietz et al. | |
| 2015/0290477 A1 | 10/2015 | Jahnke et al. | |

FOREIGN PATENT DOCUMENTS

| | | | |
|---|---|---|---|
| CN | 113599732 | A | 11/2021 |
| CN | 114949641 | A | 8/2022 |
| WO | 2014117714 | A1 | 8/2014 |
| WO | 2021258007 | A1 | 12/2021 |

* cited by examiner

SEALING COMPONENTS, FOCUSED ULTRASOUND TREATMENT SYSTEM AND OPERATION METHOD, SEMI-DRY ACOUSTIC COUPLING APPARATUS

CROSS-REFERENCE TO THE RELATED APPLICATIONS

This application is the national phase entry of International Application No. PCT/CN2022/139850, filed on Dec. 19, 2022, which is based upon and claims priority to Chinese Patent Application No. 202210041676.X, filed on Jan. 14, 2022; and Chinese Patent Application No. 202211334683.5, filed on Oct. 28, 2022, the entire contents of which are incorporated herein by reference.

TECHNICAL FIELD

The present disclosure relates to a focused ultrasound device, and in particular to sealing components, a focused ultrasound treatment system and an operation method thereof, and a semi-dry acoustic coupling apparatus.

BACKGROUND

For an ultrasonic imaging and ultrasound therapy, it is necessary to establish a prominent acoustic channel. Such an acoustic channel mainly refers to a space between an ultrasound emission surface and the skin of a patient, and this space needs to conform to the physical properties of ultrasound propagation. In addition, the air must be excluded from such a space because the air will cause the total reflection of ultrasound waves.

Common materials that meet the requirements of ultrasound propagation include: water, latexes, silica gel, or the like. Water is the optimal material with a high propagation speed and small attenuation, and the remaining materials will cause obvious reflection and attenuation.

Common coupling modes in the ultrasound therapy are wet coupling and dry coupling.

The wet coupling means that a site of the human body to be treated is completely soaked in water. The wet coupling has advantages such as simple water as a coupling medium between an ultrasound emission surface and the skin, small attenuation, thorough coupling, and a prominent effect. The wet coupling has disadvantages such as easy water leakage, complicated and bulky water treatment equipment, and laborious and time-consuming water-sealing operations.

Dry coupling means that a water storage bladder is prepared with a sound-permeable material such as a latex, an ultrasound emission surface is nested in the water storage bladder, and the water storage bladder is attached to the skin to complete the construction of an ultrasound channel. Dry coupling has advantages such as no water leakage, simplicity, lightweight, and time-saving, but exhibits disadvantages such as excessive ultrasound reflection and attenuation surfaces, an unstable coupling state, and easy occurrence of complications such as skin damage. In addition, dry coupling may damage an ultrasound generator (especially the damage of an ultrasonic imaging probe), which in turn limits the increase of a power of focused ultrasound emission.

In the present disclosure, a design and an improvement are conducted under the framework of a dry water bladder, where advantages of the dry water bladder are retained and shortcomings of the dry water bladder are overcome.

SUMMARY

According to the different advantages and disadvantages of the above two coupling modes, a focused ultrasound treatment system with the above-mentioned coupling fluid-sealing component is provided.

In order to solve the above technical problems, the present disclosure adopts the following technical solution: A focused ultrasound treatment system is provided, including a medium container with two ends opened, a waterproof adhesive ring, an ultrasound emission device, a gas pressure increase/decrease component, a coupling fluid increase/decrease component, and a pressure control module, where the ultrasound emission device includes a shell and an ultrasound emission portion, and the shell and the ultrasound emission portion enclose an inflatable confined space;

a first connecting surface of the waterproof adhesive ring is configured to attach to the skin of a patient;

a second connecting surface of the waterproof adhesive ring is bonded with a first end of the medium container, and a second end of the medium container is tightly connected with the shell of the ultrasound emission device;

a gas pressure sensor configured to detect a gas pressure at an inner side of the ultrasound emission portion is provided in the confined space, and a hydraulic pressure sensor configured to detect a pressure at an outer side of the ultrasound emission portion is provided in a coupling fluid in the medium container;

the gas pressure increase/decrease component and the coupling fluid increase/decrease component are connected with the pressure control module; and the pressure control module is configured to receive pressure data of the gas pressure sensor and the hydraulic pressure sensor and control the gas pressure increase/decrease component and the coupling fluid increase/decrease component to increase/decrease pressures at inner and outer sides of the ultrasound emission portion, respectively.

In order to solve the above technical problems, the present disclosure adopts the following preferred technical solution: The gas pressure increase/decrease component includes a gas pump, a gas-charging pipe, and a gas-discharging pipe, and the gas pump is connected with the pressure control module; and open ends of the gas-charging pipe and the gas-discharging pipe extend into the confined space.

In order to solve the above technical problems, the present disclosure adopts the following preferred technical solution: The coupling fluid increase/decrease component includes a liquid pump, a liquid-charging pipe, and a liquid-discharging pipe, and the liquid pump is connected with the pressure control module; and open ends of the liquid-charging pipe and the liquid-discharging pipe extend into the coupling fluid in the medium container to increase/decrease the coupling fluid in the medium container.

In order to solve the above technical problems, the present disclosure adopts the following preferred technical solution: A position of the hydraulic pressure sensor is close to a position of a front end of the liquid-charging pipe of the ultrasound emission portion, the hydraulic pressure sensor is connected with the pressure control module through a wire, and the wire is drawn outwards through a pipe hole of the liquid-charging pipe.

In order to solve the above technical problems, the present disclosure adopts the following preferred technical solution: A sealing ring is provided at a center of the ultrasound emission device, and an ultrasonic imaging probe is provided in a middle of the sealing ring.

In order to solve the above technical problems, the present disclosure adopts the following preferred technical solution: The second end of the medium container is connected with the shell through an annular sealing element, and the liquid-charging pipe and the liquid-discharging pipe pass through a wall of the annular sealing element.

In order to solve the above technical problems, the present disclosure adopts the following preferred technical solution: A cross section of the waterproof adhesive ring is circular or square, a lower connecting surface of the waterproof adhesive ring is the first connecting surface, and an upper connecting surface of the waterproof adhesive ring is the second connecting surface.

Another claimed subject matter of the present disclosure is as follows: An operation method for a focused ultrasound treatment system is provided, including the following steps:

step 1: cleaning the skin of a target site of a human body, and locating the focused ultrasound treatment system at an approximate zone in which a lesion of the human body is located;

step 2: attaching a first connecting surface of a waterproof adhesive ring to the skin of the human body, and allowing a second connecting surface of the waterproof adhesive ring to be always bonded with a first end of a medium container;

step 3: connecting the medium container with a shell of an ultrasound emission device, and adding a coupling fluid to the medium container;

step 4: allowing an ultrasonic imaging probe to independently undergo an axial motion or a rotary motion under driving of a motor to guide and adjust a range and an angle of ultrasonic focusing; and step 5: allowing an ultrasound emission portion of the ultrasound emission device to emit ultrasound waves.

In order to solve the above technical problems, the present disclosure adopts the following preferred technical solution: In the step 3, the coupling fluid is poured into the medium container through an opening of a second end of the medium container that is away from the waterproof adhesive ring, and the second end of the medium container is tightly connected with the shell of the ultrasound emission device through an annular sealing element.

In order to solve the above technical problems, the present disclosure adopts the following preferred technical solution: In the step 3, the medium container is first tightly fixed to the ultrasound emission device through an annular sealing element, and then the coupling fluid in the medium container is increased by the coupling fluid increase/decrease component.

In order to solve the above technical problems, the present disclosure adopts the following preferred technical solution: In the step 2, through repeated squeezing and gentle heating, bubbles between the first connecting surface of the waterproof adhesive ring and the skin are completely squeezed out to make the waterproof adhesive ring fully and thoroughly attach to the skin, such that a sealing zone capable of accumulating the coupling fluid is formed at an inner side of the medium container.

In order to solve the above technical problems, the present disclosure adopts the following preferred technical solution: The ultrasound emission device has a confined space formed at an inner side of the ultrasound emission portion;

a gas pressure sensor configured to detect a gas pressure at the inner side of the ultrasound emission portion is provided in the confined space, a hydraulic pressure sensor configured to detect a hydraulic pressure at an outer side of the ultrasound emission portion is provided in the coupling fluid in the medium container, and the gas pressure sensor and the hydraulic pressure sensor are connected with the pressure control module; and during a process from the step 3 to the step 5, the pressure control module controls the gas pressure increase/decrease component and the coupling fluid increase/decrease component to adjust air in the confined space and the coupling fluid in the sealing zone, respectively, so as to make internal and external pressures of the ultrasound emission portion balanced.

Another claimed subject matter of the present disclosure is as follows: A sealing component is provided, including a medium container with two ends opened and a waterproof adhesive ring, where a first connecting surface of the waterproof adhesive ring is configured to attach to the skin of a patient; and a second connecting surface of the waterproof adhesive ring is bonded with a first end of the medium container, and a second end of the medium container is tightly connected with a shell of an ultrasound emission device.

In order to solve the above technical problems, the third subject matter of the present disclosure adopts the following preferred technical solution: The second end of the medium container is connected with the shell through an annular sealing element.

In order to solve the above technical problems, the third subject matter of the present disclosure adopts the following preferred technical solution: A cross section of the waterproof adhesive ring is circular, square, or non-coplanar and irregular, a lower connecting surface of the waterproof adhesive ring is the first connecting surface, an upper connecting surface of the waterproof adhesive ring is the second connecting surface, and an end face of the first end of the medium container is in contact connection with the second connecting surface.

Another claimed subject matter of the present disclosure is as follows: A sealing component is provided, including a medium container and a waterproof adhesive ring, where the medium container is a cylindrical body with two ends opened;

a first connecting surface of the waterproof adhesive ring is configured to attach to the skin of a patient;

a second connecting surface of the waterproof adhesive ring is bonded with a first end of the medium container;

a second end of the medium container is opened; and a space capable of accommodating a coupling fluid is formed between the medium container and the skin of the patient.

Another claimed subject matter of the present disclosure is as follows: A focused ultrasound treatment system is provided, including a medium container with two ends opened, a waterproof adhesive ring, and an ultrasound emission device, where a second connecting surface of the waterproof adhesive ring is bonded with a first end of the medium container, a first connecting surface of the waterproof adhesive ring is configured to attach to the skin of a patient, and a space capable of accommodating a coupling fluid is formed between the medium container and the skin of the patient; and a second end of the medium container is opened, and the ultrasound emission device extends into the space from the second end of the medium container.

The present disclosure is obtained through the improvement and redesign for a dry water bladder.

Compared with the prior art, the present disclosure has the following advantage: Compared with a wet coupling fluid sealing device, the present disclosure has a small footprint and a wide application range and requires a small number of auxiliary devices, a small coupling fluid consumption, and an energy consumption reduced by about 90%, but allows exactly the same sound-permeable ability and coupling effect.

Compared with a dry coupling fluid sealing device, the present disclosure eliminates the attenuation and absorption of ultrasound by a sealing membrane to avoid the skin damage caused accordingly to the maximum extent, eliminates the reflection of ultrasound by a sealing membrane, and prevents the damage to an ultrasonic imaging probe. In addition, due to a direct heat absorption effect of a coupling fluid, the safety for a patient undergoing a long-term treatment is greatly improved. The present disclosure avoids the incomplete coupling caused by evaporation of a coupling fluid outside a bladder wall during dry coupling and a burning risk caused accordingly. As a result, the present disclosure can allow a device to increase a power of ultrasound energy emission, accelerate a treatment, and improve a therapeutic effect and has the same footprint, auxiliary devices, and energy consumption as the dry coupling fluid sealing device.

A pressure at an inner side of the ultrasound emission portion is detected by the gas pressure sensor, and a pressure at an outer side of the ultrasound emission portion is detected by the hydraulic pressure sensor. The gas pressure increase/decrease component and the coupling fluid increase/decrease component are controlled by the pressure control module to balance pressures at inner and outer sides of the ultrasound emission portion, so as to protect the ultrasound emission portion, especially to prevent a concave surface of the ultrasound emission portion from undergoing subtle deformation to cause the imbalance of an acoustic field and the weakening of a focusing effect.

When fixed on the skin, the body of the medium container is very unstable. As shown in FIG. 8, due to a lever principle, a huge force moment is generated at a bonding boundary point O between an adhesive portion and the skin, such that an adhesive force f cannot resist a force moment generated by F, and the adhesive portion cannot attach to the skin for a long time. In particular, when a treatment transducer moves, a wall of the medium container will be pulled to aggravate the tearing, thereby resulting in detachment and water leakage.

The present disclosure adopts the following technical solution to further solve the technical problems: A semi-dry acoustic coupling apparatus is provided, including a medium container and a waterproof adhesive ring, where the medium container is annular and hollow, a bottom surface of the waterproof adhesive ring is an adhesive surface configured to attach to a surface of the skin of a human body, and a bottom of the medium container is connected with a middle portion of the waterproof adhesive ring.

This arrangement of connecting the bottom of the medium container with the middle portion of the waterproof adhesive ring effectively avoids the uneven force distribution in the prior art. This connection mode can reduce a force moment in each direction of a connecting portion when the medium container is deformed to allow even force distribution.

Preferably, an edge of the bottom of the medium container is inverted T-shaped, and a bottom plane of the edge is fixedly connected with an upper surface of the waterproof adhesive ring.

This arrangement adopts a surface-to-surface connection. A force for the medium container is also arranged in the middle portion to form an inverted T shape, and an extension portion of the edge of the bottom of the medium container is provided to bear a tearing force. Because a material of the medium container itself also has a deformation ability, during excessive tearing, a strength of the connecting portion will be relatively high, and the connecting portion will undergo deformation to reduce a force moment, thereby effectively preventing the tearing-off.

Preferably, a middle portion of the upper surface of the waterproof adhesive ring is provided with a connecting seat, and the connecting seat is fixedly connected with the edge of the bottom of the medium container.

Preferably, the connecting seat is an annular and raised connecting seat.

Due to these two arrangements, the special connecting seat provides an annular protective ring, which can effectively withstand the impact of an instantaneous tearing force and effectively reduce a force moment of a force for the connecting portion to well protect the medium container.

Preferably, a bottom of an outer wall of the medium container is provided with an annular thickening portion.

Preferably, the thickening portion is arranged on an inner wall of the medium container or is arranged on the outer wall of the medium container.

These two arrangements further improve the tear resistance of the connecting portion by strengthening and thickening the connecting portion.

Preferably, the semi-dry acoustic coupling apparatus further includes a fixing jacket, and the fixing jacket is fixed on the waterproof adhesive ring to enclose the medium container.

Due to this arrangement, the fixing jacket encloses the medium container to prevent the excessive deformation of the medium container and further protect the medium container.

Preferably, a mounting groove matching with a bottom of the fixing jacket is formed on the upper surface of the waterproof adhesive ring, and the fixing jacket is fixedly connected with the mounting groove.

Preferably, a top of the medium container is provided with a folding portion configured for folding, a through hole configured to arrange an ultrasound emission device is formed at a center of the top, and an elastic belt is embedded in an edge of the through hole.

Compared with the prior art, the present disclosure has the following beneficial effects:
1. In the semi-dry acoustic coupling apparatus, a wall of the medium container is in an "inverted T-shaped" connection with the waterproof adhesive ring, where a connecting point O' is located in a middle zone (not necessarily the midpoint) of the waterproof adhesive ring, and an adhesive portion has a thickness of 1 mm to 2 mm and a width of 30 mm to 40 mm. The above values can be changed as needed. A lever of a pressure F in the medium container to a point O through a point A is only 1 mm to 2 mm, and thus an amplification effect of a force moment of the lever can be ignored.
2. A force moment action of the pressure F in the medium container 1 on the wall of the medium container is transferred to the point O', and a tearing force at the point O' is evenly distributed on a surface of the adhesive portion at inner and outer sides of the point O' through the extension portion of the wall of the medium container.

3. Due to the flexibility of the adhesive portion, the tearing force will be buffered and reduced, and will be further evenly distributed on an adhesive surface of the skin, so as to maintain the firmness of adhesion and prevent the water leakage. According to calculation, a force moment of the pressure F on the wall of the medium container is transferred to the point O through the point O', and is reduced to only 1/10 to 1/15 of the original value, such that the tearing-off resistance is greatly increased. In addition, above the point O', the thickening portion outside the wall of the medium container surrounds the medium container in a circular shape to prevent a base of the wall of the medium container from being excessively expanded and the point O' from being pulled when contents in the medium container increase or the pressure increases, which further buffers and offsets a part of the force moment of F and can well prevent the tearing-off.

4. In the semi-dry acoustic coupling apparatus, a top of the medium container is provided with a folding portion configured for folding, a through hole configured to arrange an ultrasound emission device is formed at a center of the top, and an elastic belt is embedded in an edge of the through hole, which facilitates the open or close of the top of the medium container.

5. In the semi-dry acoustic coupling apparatus, a mounting groove that has a size matching with a size of a mounting seat and is clamp-fitted with the mounting seat is formed on a top surface of the waterproof adhesive ring, and the mounting seat is fixed in the mounting groove through fixing screws, which facilitates the subsequent assembly or disassembly.

The idea of the present disclosure is as follows: A fully-sealed coupling environment is designed, a coupling fluid is allowed to directly contact the skin, the connection between the coupling fluid and the skin and the stability of the sealed coupling environment are increased, and the skin is protected. Through the above technical solution design, the fully-sealed coupling environment reduces the circulation pipeline or auxiliary structure for pressurization and emission reduction of a coupling fluid, the entire coupling and treatment process can be implemented totally in a fully-sealed independent space, and the stability of the entire coupling and treatment process can be guaranteed without causing a damage to the skin and generator.

BRIEF DESCRIPTION OF THE DRAWINGS

The present disclosure will be further described in detail below with reference to accompanying drawings and preferred embodiments. However, those skilled in the art should understand that these accompanying drawings are provided only for the purpose of explaining the preferred embodiments, and thus should not be construed as a limitation to the scope of the present disclosure. In addition, unless otherwise specified, the accompanying drawings are only intended to conceptually represent the composition or configuration of the described object and may include exaggerated displays, and the accompanying drawings are not necessarily drawn to scale.

DETAILED DESCRIPTION OF THE EMBODIMENTS

Figure 1:
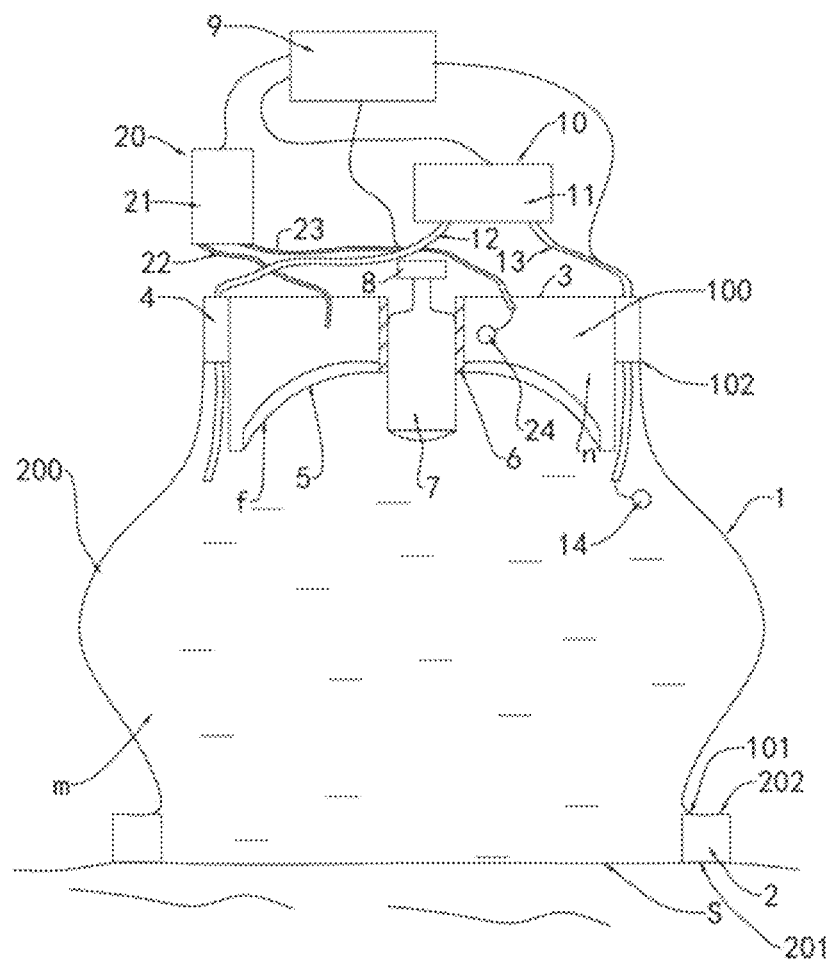
FIG. 1 is a schematic diagram of the focused ultrasound treatment system in Embodiment 1 of the present disclosure.

The preferred embodiments of the present disclosure will be described in detail below with reference to the accompanying drawings. It will be understood by those skilled in the art that the descriptions are only illustrative and exemplary, and should not be construed as a limitation to the protection scope of the present disclosure.

It should be noted that similar reference numerals represent similar items in the accompanying drawings. Therefore, once an item is defined in one accompanying drawing, the item does not need to be further defined and explained in subsequent accompanying drawings.

In the description of the present disclosure, it should be noted that orientations or position relationships indicated by terms such as "upper", "lower", "front", "back", "inner", and "outer" are orientation or position relationships that are customarily arranged when the product of the present disclosure is in use, are based on the orientation or position relationships shown in the accompanying drawings, or are orientation or position relationships shown in the accompanying drawings. These terms are only used to facilitate the description of the present disclosure and simplify the description, but not to indicate or imply that the mentioned apparatus or components must have a specific orientation or must be established and operated in a specific orientation, and thus these terms cannot be understood as a limitation to the present disclosure.

Embodiment 1

The focused ultrasound treatment system is an apparatus that scans and treats a tumor tissue with a high-energy acoustic intensity at a high-intensity focused ultrasound (HIFU) focusing zone. As shown in FIG. 1, the focused ultrasound treatment system includes ultrasound emission device 100 and coupling fluid-sealing component 200 for focused ultrasound. The coupling fluid-sealing component 200 for focused ultrasound includes medium container 1 with two ends opened and waterproof adhesive ring 2. The ultrasound emission device 100 is arranged at the medium container 1. First connecting surface 201 of the waterproof adhesive ring 2 is configured to attach to the skin of a patient. Second connecting surface 202 of the waterproof adhesive ring 2 is bonded with first end 101 of the medium container 1, and second end 102 of the medium container 1 is tightly connected with shell 3 of the ultrasound emission device 100. As a result, the medium container 1, the shell 3 of the ultrasound emission device 100, and the skin enclose a sealing zone m capable of accommodating a coupling fluid.

Compared with the wet coupling mode where the human body is completely soaked in water, this focused ultrasound treatment system adopts the medium container 1 to accumulate the coupling fluid for wet coupling with the human body, and adopts water as a single coupling medium, which has advantages such as small attenuation, thorough coupling, and excellent effect and overcomes the shortcoming that the wet coupling mode is prone to water leakage and has a complicated and bulky structure.

In addition, during the wet coupling mode where the human body is completely soaked in water, a body of a patient is soaked in the coupling fluid during the entire process, and an ultrasound treatment system is completely soaked in the coupling fluid. As a result, spatial relationships of the ultrasound treatment system with the body and a coupling container cannot be completely directly observed, there is a large contact area between a coupling device and the body, and there are many sealing loopholes and easy water leakage, resulting in troublesome operations and a time-consuming treatment process.

The focused ultrasound treatment system provided in this embodiment can horizontally locate initial positions of the ultrasound emission device 100 and a lesion before a treatment begins to make the lesion covered by a region of the medium container 1, and subsequently, only the position of the lesion needs to be longitudinally located to determine an emission angle of ultrasound waves. Therefore, the focused ultrasound treatment system can allow an excellent therapeutic effect with convenient and time-saving operations.

It can be seen that the focused ultrasound treatment system in this embodiment has a small footprint and a wide application range and requires a small number of auxiliary devices, a small coupling fluid consumption, and an energy consumption reduced by about 90%, but allows exactly the same sound-permeable ability and coupling effect.

Compared with the traditional dry coupling, in this embodiment, the medium container 1 is openly coupled with the human body, and the coupling fluid is filled in the medium container 1. An ultrasound emission surface of the ultrasound emission device 100 is coupled with the skin simply with the coupling fluid as a coupling medium, and there is no barrier of a sealing membrane medium such as silica gel between the skin of the human body and the coupling fluid, which reduces the excessive ultrasound reflection and attenuation surfaces that exist during the traditional dry coupling to allow advantages such as small attenuation, thorough coupling, stable coupling state, and prominent ultrasound effect.

The focused ultrasound treatment system eliminates the attenuation and absorption of ultrasound by a sealing membrane to avoid the skin damage caused accordingly to the maximum extent. In addition, due to a direct heat absorption effect of the coupling fluid, the safety for a patient undergoing a long-term treatment is greatly improved.

The focused ultrasound treatment system avoids the incomplete coupling caused by evaporation of a coupling fluid outside a bladder wall during dry coupling and a burning risk caused accordingly. In addition, the focused ultrasound treatment system retains the advantages of simplicity and flexible operations of the traditional dry-coupling device. These advantages are conducive to the promotion and application of the focused ultrasound treatment system.

As shown in FIG. 1, the second end 102 of the medium container 1 is connected with the shell 3 through annular sealing element 4. Specifically, an inner side of the second end 102 of the medium container 1 is tightly fitted with an outer side of the shell 3 through the annular sealing element 4 to allow sealing.

The waterproof adhesive ring 2 is a waterproof adhesive material that can tightly attach to the skin. The waterproof adhesive ring is in a form of a planar membrane, has a specified thickness, and exhibits excellent histocompatibility and water tightness. According to different needs, ring belts with specified widths and different shapes can be prepared. One side of the waterproof adhesive ring attaches to the skin, which can prevent the coupling fluid from leaking from a surface of the skin. The other side of the waterproof adhesive ring attaches to the medium container, which can prevent the coupling fluid from leaking between the two. The material and function of the waterproof adhesive ring can also be replaced by a flexible or semi-flexible device with a skin-adhesive capability.

Preferably, a cross section of the waterproof adhesive ring 2 is square, circular, or non-coplanar and irregular, a lower connecting surface of the waterproof adhesive ring 2 is the first connecting surface 201, an upper connecting surface of the waterproof adhesive ring 2 is the second connecting surface 202, and an end face of the first end 101 of the medium container 1 is in contact connection with the second connecting surface 202.

It should be understood that the shape and size of the waterproof adhesive ring 2 can be determined as needed, a function of the waterproof adhesive ring is to confine a specified amount of the coupling fluid in a specified zone on a surface of the skin, and the confined coupling fluid can be located above, below, and at a side of the skin as a coupling and sound-permeating channel between the ultrasound emission device and the skin.

Preferably, the medium container 1 is produced with a waterproof membrane of a polymeric material such as a plastic, a latex, or a nanomaterial, and the medium container 1 and the waterproof adhesive ring 2 are connected as a whole.

Preferably, the coupling fluid can be water or another sound-permeable liquid.

As shown in FIG. 1, preferably, the focused ultrasound treatment system further includes coupling fluid increase/decrease component 10, and the coupling fluid increase/decrease component 10 can supplement or discharge the coupling fluid to or from the sealing zone m enclosed by the medium container 1, the shell 3 of the ultrasound emission device 100, and the skin.

As shown in FIG. 1, in addition to the shell 3, the ultrasound emission device 100 includes ultrasound emission portion 5 with the above-mentioned ultrasound emission surface f, sealing ring 6, and ultrasonic imaging probe 7.

The ultrasound emission portion 5 is an arc structure with a middle hole, where a concave surface faces towards a side of a patient and a convex surface is away from the patient.

The concave surface of the ultrasound emission portion 5 is a focused ultrasound emission surface. High-energy ultrasound waves emitted by the focused ultrasound emission surface are propagated through the coupling fluid, penetrates through the skin, and enters a body tissue to generate a focus point, and a high temperature and a high pressure are produced at the focus point. When at a lesion, the focus point can be used for treating the lesion.

The shell 3 is a support for the ultrasound emission portion 5, and the sealing ring 6 is located at the middle hole of the ultrasound emission portion 5 and extends in a longitudinal direction to produce a columnar body. The sealing ring 6 is tightly sleeved with the ultrasound emission portion 5 through a barrel-shaped gasket ring.

The ultrasonic imaging probe 7 can undergo telescopic and rotary motions in the sealing ring 6 to detect a lesion. Specifically, the ultrasonic imaging probe is provided with motor 8. The ultrasonic imaging probe 7 independently undergoes an axial motion or a rotation under driving of the motor 8 to approach or stay away from a human body.

As shown in FIG. 1, the shell 3, the ultrasound emission portion 5, and the sealing ring 6 enclose a confined space n that is inflatable or deflatable, the confined space n is located at a side of the convex surface of the ultrasound emission portion 5, and a gas in the confined space is preferably air.

Preferably, the focused ultrasound treatment system further includes gas pressure increase/decrease component 20, and the gas pressure increase/decrease component 20 can adjust a retention amount of the gas in the confined space n, thereby controlling a pressure acting on the convex surface of the ultrasound emission portion 5.

It should be noted that the ultrasound emission portion 5 is generally made of a piezoelectric ceramic or polymeric resin synthetic material, and thus the ultrasound emission portion is fragile and prone to deformation, has poor firmness, and is easily damaged under a collision or pressure. In addition, when the ultrasound emission portion 5 is deformed or damaged, the focusing performance decreases, which causes the deterioration of an ultrasound treatment effect and may also lead to skin damage.

The gas pressure increase/decrease component 20 can inflate or deflate the confined space, such that pressures for inner and outer surfaces of the ultrasound emission portion 5 are balanced as much as possible, and thus the deformation of the ultrasound emission portion is reduced to prevent the ultrasound emission portion 5 from being damaged under compression and avoid the deformation of the surfaces.

As shown in FIG. 1, preferably, the focused ultrasound treatment system provided in this embodiment includes gas pressure sensor 24 and hydraulic pressure sensor 14. The gas pressure sensor 24 is arranged in the confined space to detect a gas pressure in the confined space n, namely, a gas pressure at an inner side of the ultrasound emission portion 5. The hydraulic pressure sensor 14 is arranged outside the confined space, namely, in the coupling fluid in the medium container, so as to detect a hydraulic pressure at an outer side of the ultrasound emission portion 5.

The focused ultrasound treatment system further includes pressure control module 9. the pressure control module 9 is connected with the gas pressure sensor 24, the hydraulic pressure sensor 14, the gas pressure increase/decrease component 20, and the coupling fluid increase/decrease component 10 through wires.

The pressure control module 9 is configured to receive pressure data of the gas pressure sensor 24 and the hydraulic pressure sensor 14 and control the gas pressure increase/decrease component 20 and the coupling fluid increase/decrease component 10 to increase/decrease pressures at inner and outer sides of the ultrasound emission portion 5, respectively.

More specifically, the pressure control module 9 is configured to receive signals of the gas pressure sensor 24 and the hydraulic pressure sensor 14 and compare a value difference between the gas pressure sensor 24 and the hydraulic pressure sensor 14. The pressure control module 9 is provided with a program to set a threshold for the value difference. If the value difference exceeds the threshold, the pressure control module 9 will control the gas pressure increase/decrease component 20 and the coupling fluid increase/decrease component 10 to adjust pressures. In this way, the pressures inside and outside the ultrasound emission portion 5 can be automatically and adaptively adjusted to complete the given pressure increase and decrease, maintain the balance between a pressure in the treatment transducer and a pressure of the coupling fluid, maintain a stable form of the ultrasound emission portion 5, prevent the deformation, and guarantee the uniform output of ultrasound energy.

As shown in FIG. 1, preferably, the gas pressure increase/decrease component 20 includes gas pump 21, gas-charging pipe 22, and gas-discharging pipe 23. The gas pump 21 is connected with the pressure control module 9. Open ends of the gas-charging pipe 22 and the gas-discharging pipe 23 extend into the confined space n.

Preferably, the coupling fluid increase/decrease component 10 includes liquid pump 11, liquid-charging pipe 12, and liquid-discharging pipe 13. One end of each of the liquid-charging pipe 12 and the liquid-discharging pipe 13 passes through a wall of the annular sealing element 4 and then is connected with the liquid pump 11, and the other open end extends into the medium container 1 to increase or decrease the coupling fluid in the medium container 1. The liquid pump 11 is connected with the pressure control module 9, and is controlled by the pressure control module 9 to open or close to allow the liquid charging or the liquid discharging.

Further preferably, a position of the hydraulic pressure sensor 14 is close to a position of a front end of the liquid-charging pipe 12 of the ultrasound emission portion 5, the hydraulic pressure sensor 14 is connected with the pressure control module 9 through a wire, and the wire is drawn outwards through a pipe hole of the liquid-charging pipe 12.

It should be understood that, in an initial state, one end of the medium container 1 is in sealed connection with the ultrasound emission device 100, the other end remains open, and there is no coupling fluid inside the medium container 1.

When in use, the skin of a target site is cleaned, a rough location is conducted between the focused ultrasound treatment system and a human body of a patient, that is, the system is located at an approximate zone in which a lesion is located.

The first connecting surface 201 of the waterproof adhesive ring 2 smoothly attaches to the skin of the site of a human body according to a need. Through repeated squeezing and gentle heating, bubbles between the first connecting surface 201 of the waterproof adhesive ring 2 and the skin are completely squeezed out to make the waterproof adhesive ring 2 fully and thoroughly attach to the skin, such that a sealing zone m capable of accumulating the coupling fluid is formed at an inner side of the medium container 1.

Then, the coupling fluid is poured into the medium container through an opening of the other end of the medium container 1 that is away from the waterproof adhesive ring 2, and when the medium container is about to be full, the medium container is tightly fixed to the ultrasound emission device through the annular sealing element 4. Of course, the medium container 1 can be tightly fixed to the ultrasound emission device through the annular sealing element 4 directly, and then the coupling fluid in the sealing zone m is increased by the coupling fluid increase/decrease component 10.

During this process, the liquid-discharging pipe arranged next to the ultrasound emission device can be used to allow the exhaustion of a residual gas and adjust an amount and pressure of the coupling fluid to meet the requirements of ultrasound emission.

At the same time, the gas pressure sensor 24 and the hydraulic pressure sensor 14 work, and the gas pressure increase/decrease component 20 synchronously inflates the confined space n enclosed by the shell 3, the ultrasound emission portion 5, and the sealing ring 6 to keep a pressure balance.

The ultrasonic imaging probe 7 independently undergoes an axial motion under driving of the motor 8 to approach or stay away from a human body to detect a specific position of a lesion, and then a longitudinal position of the ultrasound emission device 100 is adjusted to adjust a range and an angle of ultrasonic focusing, thereby allowing an effective treatment.

During this process, the gas pressure sensor 24 and the hydraulic pressure sensor 14 always work, and the gas pressure increase/decrease component 20 cooperates with the coupling fluid increase/decrease component 10 to adjust the coupling fluid in the sealing zone m and the air in the confined space n, respectively, thereby making the internal and external pressures of the ultrasound emission portion balanced and protecting the ultrasound emission portion in real time.

Embodiment 2

In this embodiment, on the basis of Embodiment 1, an adjustment is conducted for combining an ultrasound emission device with a coupling fluid-sealing component for focused ultrasound. Only different parts are described below, and the same parts as in Embodiment 1 are not repeated.

Figure 2:
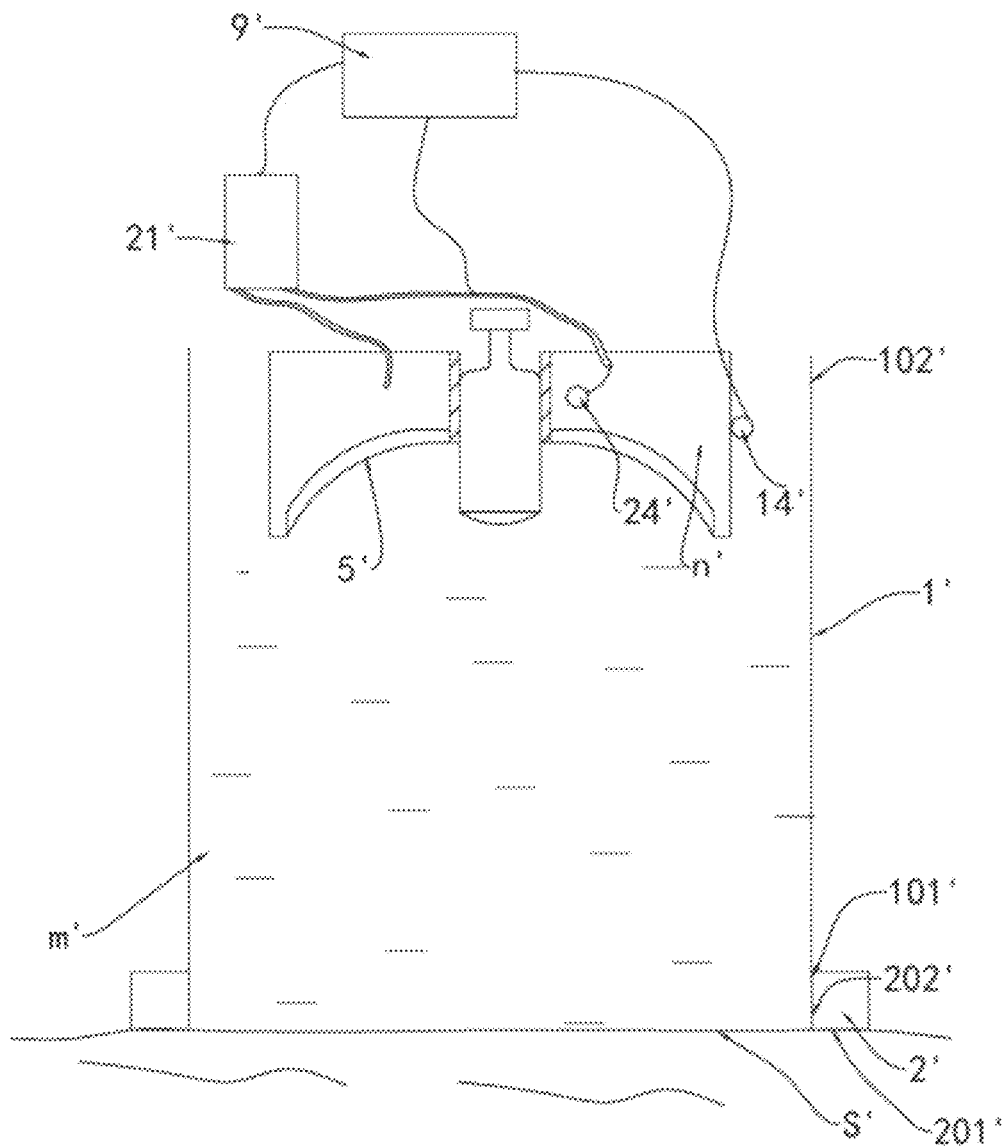
FIG. 2 is a schematic diagram of the focused ultrasound treatment system in Embodiment 2 of the present disclosure.
Figure 3:
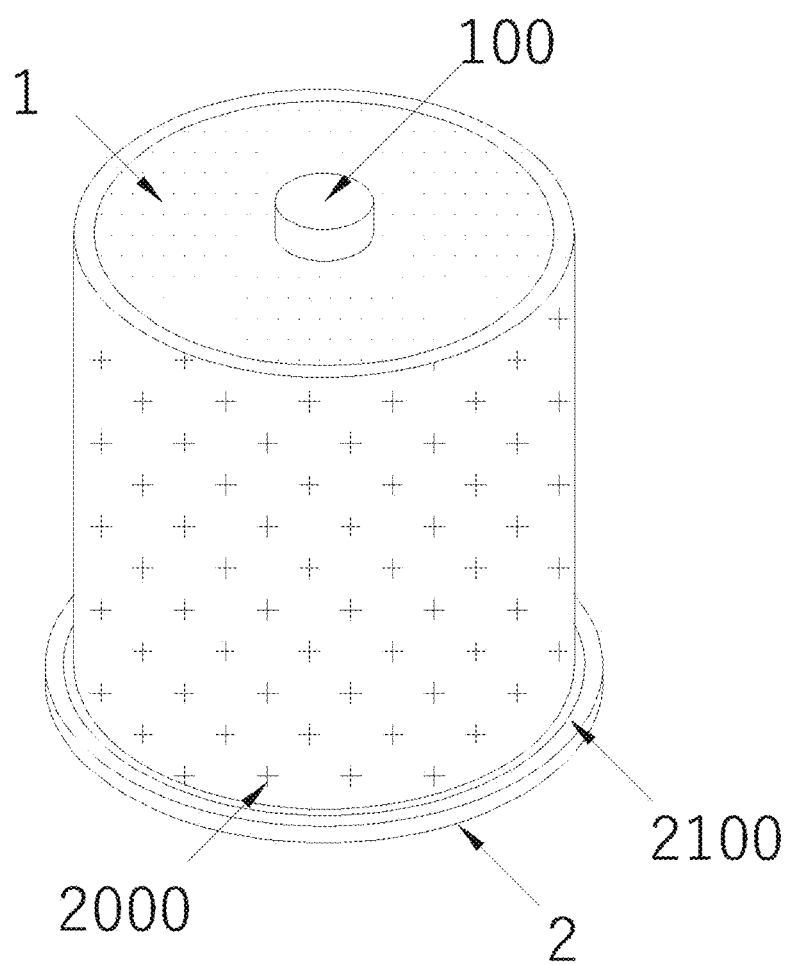
FIG. 3 is a schematic structural diagram of the semi-dry acoustic coupling apparatus of the present disclosure.

As shown in FIG. 2, a focused ultrasound treatment system includes an ultrasound emission device and coupling fluid-sealing component 200' for focused ultrasound. The coupling fluid-sealing component for focused ultrasound includes cylindrical medium container 1' with two ends opened and waterproof adhesive ring 2'. First connecting surface 201' of the waterproof adhesive ring 2' is configured to attach to the skin S' of a patient. Second connecting surface 202' of the waterproof adhesive ring 2' is bonded with first end 101' of the medium container 1', and second end 102' of the medium container 1' is opened. As a result, the medium container 1' and the skin enclose a space m that can accommodate a coupling fluid and has an upper end opened, and the ultrasound emission device extends into the space from the second end of the medium container.

Preferably, the medium container 1' includes an impermeable flexible bag and a telescopic support, and thus can be unfolded to produce a cylindrical body. Or, the medium container 1' is a rigid or telescopic part formed integrally.

As shown in FIG. 2, preferably, the focused ultrasound treatment system further includes a gas-guiding pipe and gas pump 21', which can adjust a retention amount of a gas in a confined space n' of the ultrasound emission device, thereby controlling a pressure acting on a convex surface of ultrasound emission portion 5'.

The focused ultrasound treatment system includes gas pressure sensor 24' and hydraulic pressure sensor 14'. The gas pressure sensor 24' is arranged in the confined space n' to detect a gas pressure in the confined space n', namely, a gas pressure at an inner side of the ultrasound emission portion 5'. The hydraulic pressure sensor 14' is arranged at an outer side of the ultrasound emission portion 5' to detect a hydraulic pressure of the coupling fluid at an outer side of the ultrasound emission portion 5'.

The focused ultrasound treatment system further includes pressure control module 9'. the pressure control module 9' is connected with the gas pressure sensor 24', the hydraulic pressure sensor 14', and the gas pump through wires.

The pressure control module 9' is configured to receive pressure data of the gas pressure sensor 24' and the hydraulic pressure sensor 14' and control the gas pump to maintain a balance between a pressure in the ultrasound emission portion and a pressure of the coupling fluid.

A semi-dry acoustic coupling apparatus is provided, as shown in FIG. 2 to FIG. 5, including: Medium container 1: The medium container is annular and hollow, has a bottom opened, and is filled with water or a coupling fluid. Ultrasound emission device 100 is provided at a top of the medium container 1. Annular thickening portion 1200 is provided at a bottom of an outer wall of the medium container 1. Fixing jacket 2000: The fixing jacket 2000 is sleeved on the medium container 1, and a gap is left between the fixing jacket 2000 and an outer wall of the medium container 1. Waterproof adhesive ring 2: A bottom surface of the waterproof adhesive ring 2 is an adhesive surface and is configured to attach to a surface of the skin of a human body. The waterproof adhesive ring 2 is annular and is integrally formed with the medium container 1. A cross section between the wall of the medium container 1 and the waterproof adhesive ring 2 is an inverted "T"-shaped structure. A bottom of the waterproof adhesive ring 2 is provided with a release film.

Figure 5:
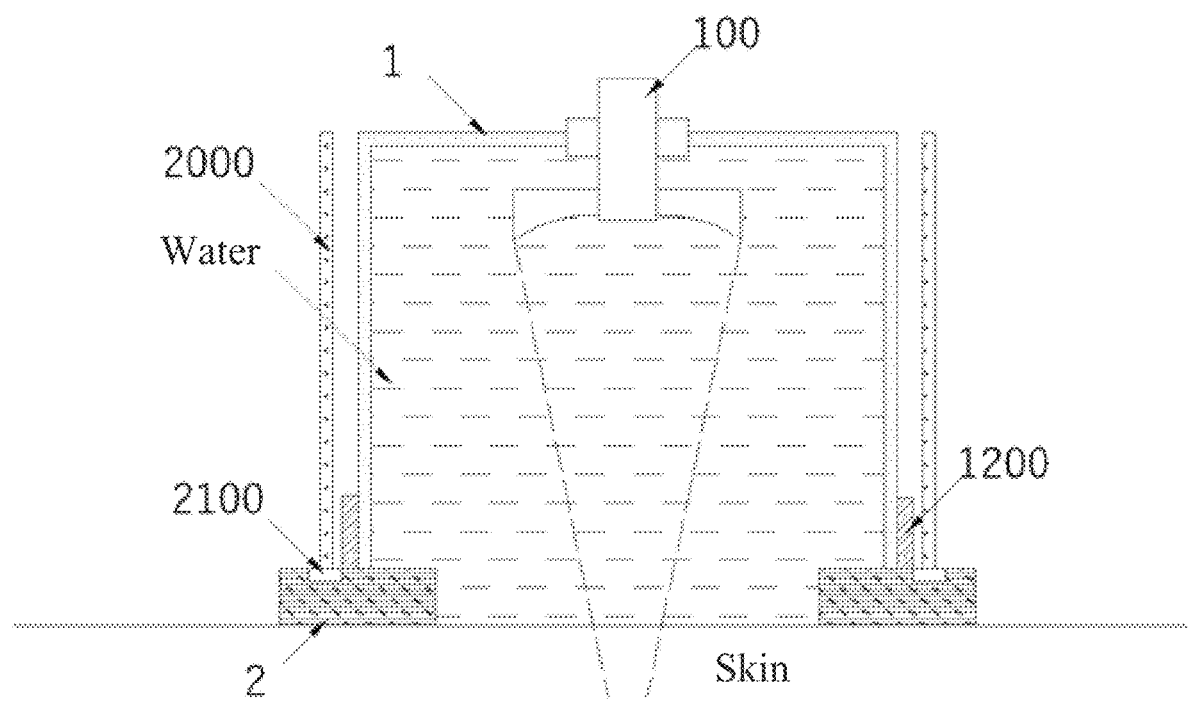
FIG. 5 is a schematic diagram of a cross-sectional structure of the semi-dry acoustic coupling apparatus of the present disclosure.
Figure 6:
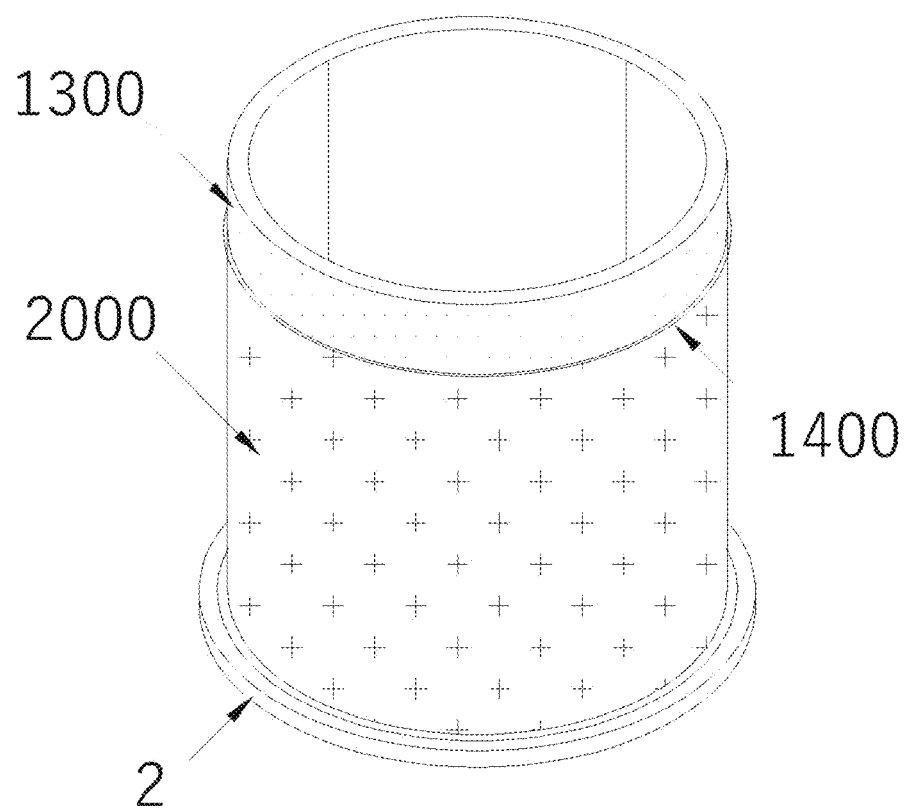
FIG. 6 is a schematic structural diagram of the folding portion of the present disclosure that is folded.
Figure 7:
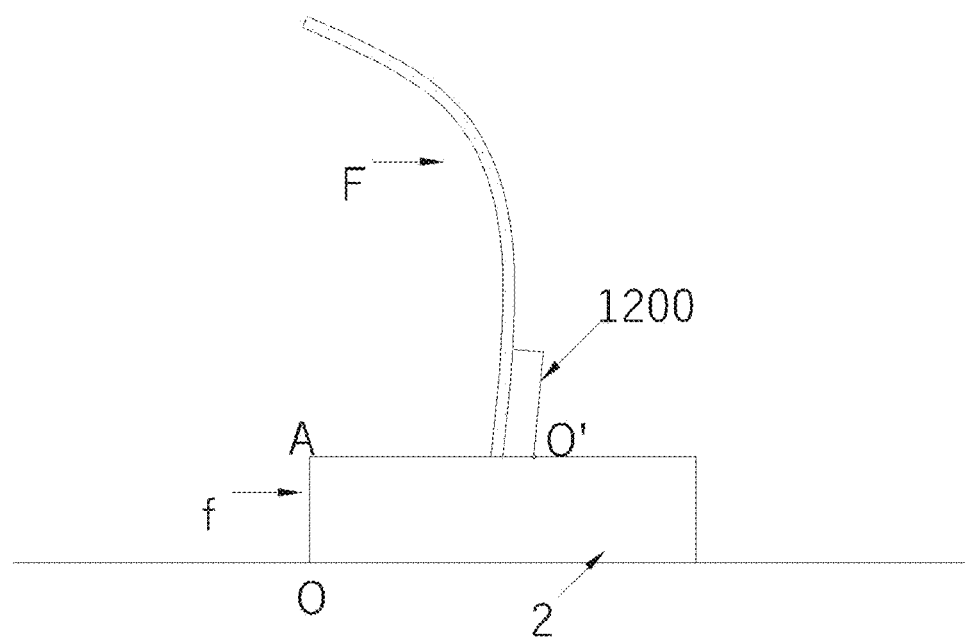
FIG. 7 shows the force analysis between the medium container and the adhesive seat of the present disclosure.
Figure 8:
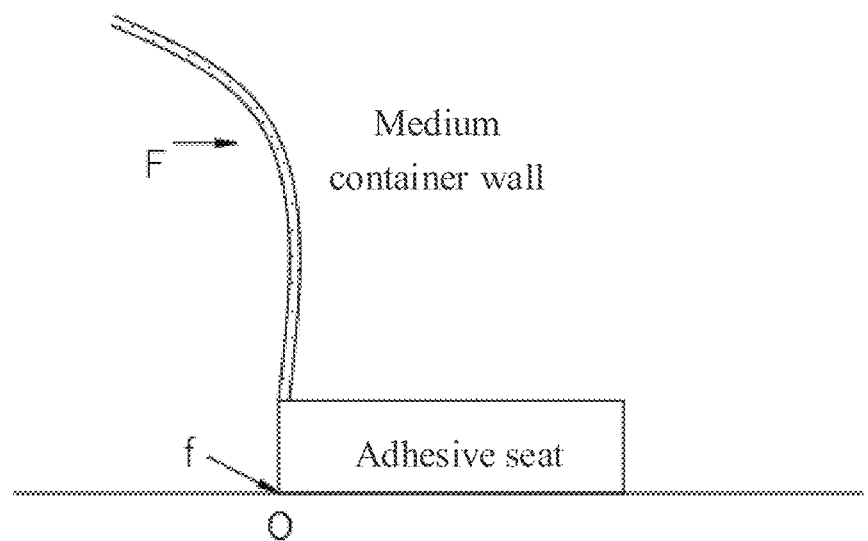
FIG. 8 shows the force analysis between the medium container and the adhesive seat in the reference document.

A force principle between the wall of the medium container 1 and the waterproof adhesive ring 2 is shown in FIG. 5, and the force analysis is as follows:

The wall of the medium container 1 is in an "inverted T-shaped" connection with the waterproof adhesive ring 2, where a connecting point O' is located in a middle zone (not necessarily the midpoint) of the waterproof adhesive ring 2, and an adhesive portion has a thickness of 1 mm to 2 mm and a width of 30 mm to 40 mm. The above values can be changed as needed. A lever of a pressure F in the medium container 1 to a point O through a point A is only 1 mm to 2 mm, and thus an amplification effect of a force moment of the lever can be basically ignored. A force moment action of the pressure F in the medium container 1 on the wall of the medium container is transferred to the point O', and a tearing force at the point O' is evenly distributed on a surface of the adhesive portion at inner and outer sides of the point O' through the extension portion of the wall of the medium container. Due to the flexibility of the adhesive portion, the tearing force will be buffered and reduced, and will be further evenly distributed on an adhesive surface of the skin, so as to maintain the firmness of adhesion and prevent the water leakage. According to calculation, a force moment of the pressure F on the wall of the medium container is transferred to the point O through the point O', and is reduced to only $\frac{1}{10}$ to $\frac{1}{15}$ of the original value, such that the tearing-off resistance is greatly increased. In addition, above the point O', the thickening portion 1200 outside the wall of the medium container surrounds the medium container in a circular shape to prevent a base of the wall of the medium container from being excessively expanded and the point O' from being pulled when contents in the medium container increase or the pressure increases, which further buffers and offsets a part of the force moment of F and can well prevent the tearing-off.

Figure 4:
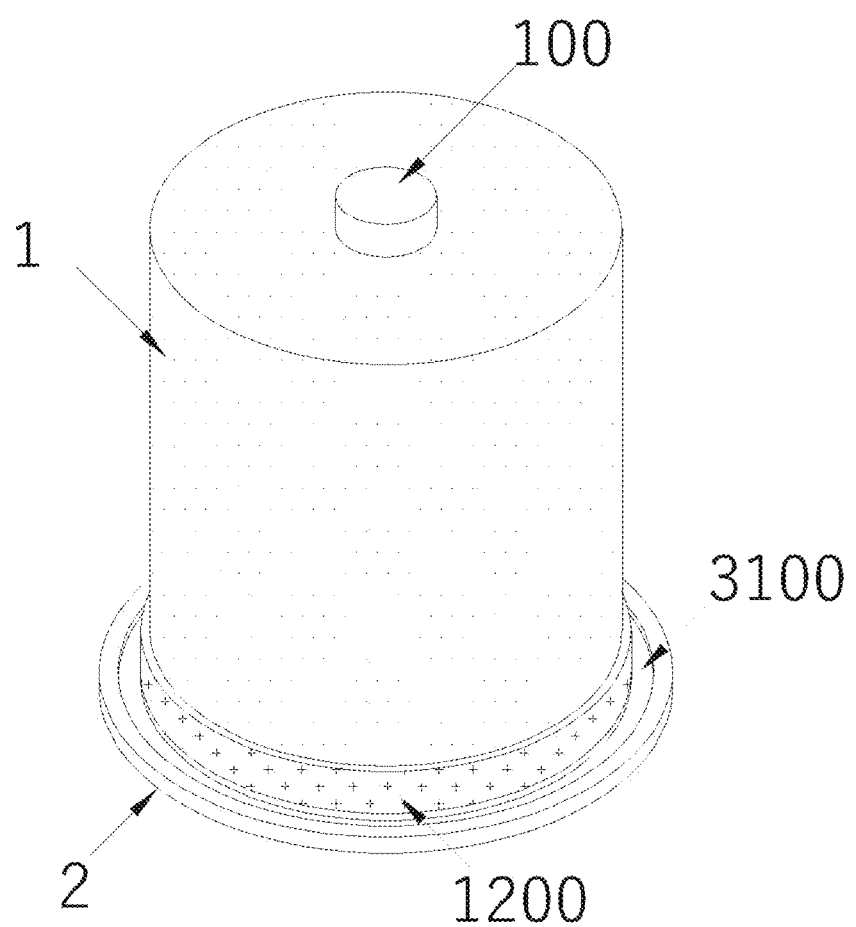
FIG. 4 is a schematic structural diagram of the internal medium container of the present disclosure.

Further, as shown in FIG. 4, a top of the medium container 1 is provided with folding portion 1300 configured for folding, a through hole configured to arrange the ultrasound emission device 100 is formed at a center of the top, and elastic belt 1400 is embedded in an edge of the through hole, which facilitates the open or close of the top of the medium container 1.

It should be noted that the elastic belt 1400 is made of a flexible material such as a rubber material, and has a thickness of no less than 0.1 mm.

Specifically, the thickening portion 1200 and the outer wall of the medium container 1 are integrally formed.

In addition, annular mounting seat 2100 is provided at a bottom of the fixing jacket 2000, and a cross section between a side wall of the fixing jacket 2000 and the mounting seat 2100 is an inverted "T"-shaped structure. Mounting groove 3100 that has a size matching with a size of the mounting seat 2100 and is clamp-fitted with the mounting seat is formed on a top surface of the waterproof adhesive ring 2, and the mounting seat 2100 is fixed in the mounting groove 3100 through fixing screws, which facilitates the subsequent assembly or disassembly.

A working principle of the semi-dry acoustic coupling apparatus of the present disclosure is as follows: When in use, the release film at the bottom of the waterproof adhesive ring 2 is torn down by an operator, the waterproof adhesive ring 2 attaches to the skin to be treated of a patient, water or a coupling fluid is added to the medium container 1, the ultrasound emission device 100 is arranged at a top of the medium container 1, the folding portion 1300 is folded, and the elastic belt 1400 is in elastic contact with the ultrasound emission device 100, as shown in FIG. 1, so as to conduct a semi-dry ultrasound treatment.

In the above embodiment, the medium container 1 is in inverted T-shaped connection with the waterproof adhesive ring 2, but this connection mode can be replaced with a planar or raised connecting seat, which can also allow a corresponding technical effect. The thickening portion 1200 is arranged on the outer wall of the medium container 1, but the thickening portion 1200 can also be arranged on an inner wall of the medium container 1, or a half of the thickening portion is arranged on the outer wall of the medium container 1 and the other half of the thickening portion is arranged on the inner wall of the medium container 1, which can also allow the same effect. Therefore, the above-mentioned connection modes can equivalently replace the corresponding connection structures in the above embodiment, and also fall within the protection scope of the present disclosure.

The basic principles, main features, and advantages of the present disclosure are shown and described above. It should be understood by those skilled in the art that, the present disclosure is not limited by the above embodiments, and the above embodiments and the description in this specification are merely preferred embodiments of the present disclosure, and are not intended to limit the present disclosure. Various changes and modifications may be made to the present disclosure without departing from the spirit and scope of the present disclosure, and such changes and modifications all fall within the claimed protection scope of the present disclosure. The claimed protection scope of the present disclosure is defined by the appended claims and equivalents thereof.

What is claimed is:

1. A focused ultrasound treatment system, comprising a medium container with two ends opened, a waterproof adhesive ring, an ultrasound emission device, a gas pressure increase/decrease component, a coupling fluid increase/decrease component, and a pressure control module, wherein the ultrasound emission device comprises a shell and an ultrasound emission portion, and the shell and the ultrasound emission portion enclose an inflatable confined space;
a first connecting surface of the waterproof adhesive ring is configured to attach to a skin of a patient;
a second connecting surface of the waterproof adhesive ring is bonded with a first end of the medium container with two ends opened, and a second end of the medium container is tightly connected with the shell of the ultrasound emission device;
a gas pressure sensor configured to detect a gas pressure at an inner side of the ultrasound emission portion is provided in the confined space, and a hydraulic pressure sensor configured to detect a pressure at an outer side of the ultrasound emission portion is provided in a coupling fluid in the medium container;
the gas pressure increase/decrease component and the coupling fluid increase/decrease component are connected with the pressure control module; and
the pressure control module is configured to receive pressure data of the gas pressure sensor and the hydraulic pressure sensor and control the gas pressure increase/decrease component and the coupling fluid increase/decrease component to increase/decrease pressures at inner and outer sides of the ultrasound emission portion, respectively.

2. The focused ultrasound treatment system according to claim 1, wherein the gas pressure increase/decrease component comprises a gas pump, a gas-charging pipe, and a gas-discharging pipe, and the gas pump is connected with the pressure control module; and
open ends of the gas-charging pipe and the gas-discharging pipe extend into the confined space.

3. The focused ultrasound treatment system according to claim 1, wherein the coupling fluid increase/decrease component comprises a liquid pump, a liquid-charging pipe, and a liquid-discharging pipe, and the liquid pump is connected with the pressure control module; and
open ends of the liquid-charging pipe and the liquid-discharging pipe extend into the coupling fluid in the medium container to increase/decrease the coupling fluid in the medium container.

4. The focused ultrasound treatment system according to claim 3, wherein a position of the hydraulic pressure sensor is close to a position of a front end of the liquid-charging pipe of the ultrasound emission portion, the hydraulic pressure sensor is connected with the pressure control module through a wire, and the wire is drawn outwards through a pipe hole of the liquid-charging pipe.

5. The focused ultrasound treatment system according to claim 3, wherein the second end of the medium container is connected with the shell through an annular sealing element, and the liquid-charging pipe and the liquid-discharging pipe pass through a wall of the annular sealing element.

6. The focused ultrasound treatment system according to claim 5, wherein a cross section of the waterproof adhesive ring is square, circular, or non-coplanar and irregular, a lower connecting surface of the waterproof adhesive ring is the first connecting surface, and an upper connecting surface of the waterproof adhesive ring is the second connecting surface.

7. An operation method for a focused ultrasound treatment system, comprising:
providing a medium container with two ends opened,
a waterproof adhesive ring, an ultrasound emission device, a gas pressure increase/decrease component,
a coupling fluid increase/decrease component, and
a pressure control module,
wherein the ultrasound emission device comprises a shell and an ultrasound emission portion, and the shell and the ultrasound emission portion enclose an inflatable confined space;
a gas pressure sensor configured to detect a gas pressure at the inner side of the ultrasound emission portion is provided in the confined space,
a hydraulic pressure sensor configured to detect a hydraulic pressure at an outer side of the ultrasound emission portion is provided in the coupling fluid in the medium container, and
the gas pressure sensor and the hydraulic pressure sensor are connected with a pressure control module; and
performing the following steps:
step 1: cleaning a skin of a target site of a human body, and locating the focused ultrasound treatment system at an approximate zone where a lesion of the human body is located;
step 2: attaching a first connecting surface of the waterproof adhesive ring to the skin of the human body, and allowing a second connecting surface of the waterproof adhesive ring to be always bonded with a first end of the medium container;
step 3: connecting the medium container with the shell of the ultrasound emission device, and adding a coupling fluid to the medium container;
step 4: allowing an ultrasonic imaging probe to independently undergo an axial motion or a rotary motion under driving of a motor to guide and adjust a range and an angle of ultrasonic focusing; and
step 5: allowing the ultrasound emission portion of the ultrasound emission device to emit ultrasound waves.

8. The operation method for the focused ultrasound treatment system according to claim 7, wherein in the step 3, the coupling fluid is poured into the medium container through an opening of a second end of the medium container that is away from the waterproof adhesive ring, and the second end of the medium container is tightly connected with the shell of the ultrasound emission device through an annular sealing element.

9. The operation method for the focused ultrasound treatment system according to claim 7, wherein in the step 3, the medium container is tightly fixed to the ultrasound emission device through an annular sealing element, and the coupling fluid in the medium container is increased by the coupling fluid increase/decrease component.

10. The operation method for the focused ultrasound treatment system according to claim 7, wherein in the step 2, through repeated squeezing and gentle heating, bubbles between the first connecting surface of the waterproof adhesive ring and the skin are completely squeezed out to make the waterproof adhesive ring fully and thoroughly attach to the skin, wherein a sealing zone allowed for accumulating the coupling fluid is formed at an inner side of the medium container.

11. The operation method for the focused ultrasound treatment system according to claim 10, wherein during a process from the step 3 to the step 5, the pressure control module controls the gas pressure increase/decrease component and the coupling fluid increase/decrease component to adjust air in the confined space and the coupling fluid in the sealing zone, respectively to make internal and external pressures of the ultrasound emission portion balanced.

* * * * *